March 23, 1965 G. L. MITTELSTEADT 3,174,656
POWDER DISPENSING APPARATUS INCLUDING ROTARY CONVEYORS
Filed April 1, 1963
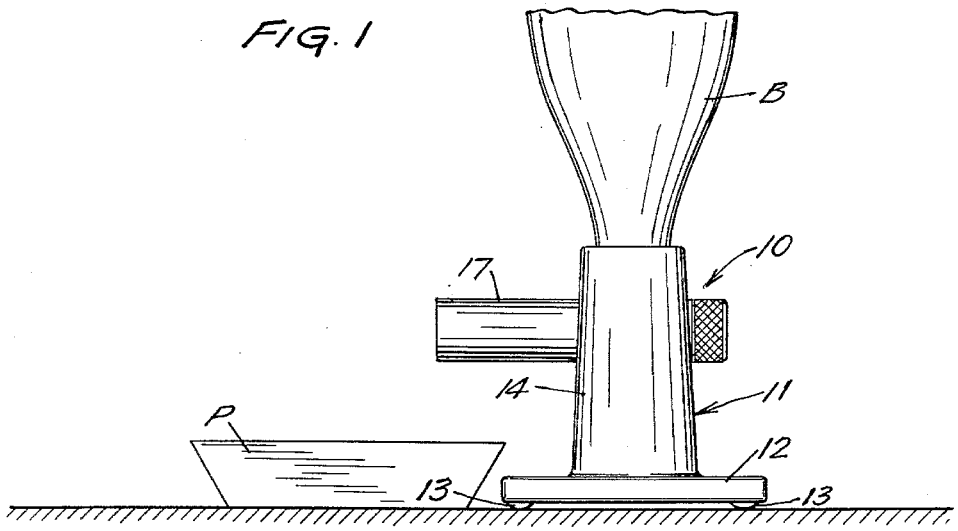
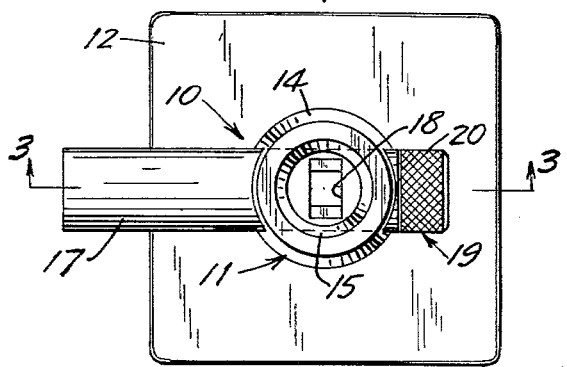
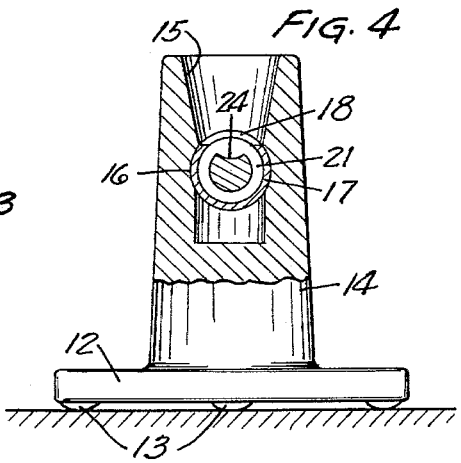
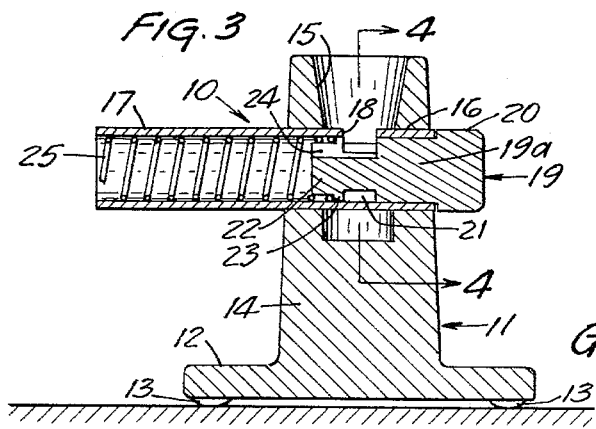
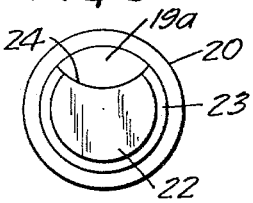
INVENTOR
GLEN L. MITTELSTEADT
BY Williamson & Palmatier
ATTORNEYS

United States Patent Office 3,174,656
Patented Mar. 23, 1965

3,174,656
POWDER DISPENSING APPARATUS INCLUDING ROTARY CONVEYORS
Glen L. Mittelsteadt, Waseca, Minn., assignor to Herter's Inc., Waseca, Minn., a corporation of Minnesota
Filed Apr. 1, 1963, Ser. No. 269,531
5 Claims. (Cl. 222—252)

This invention relates to dispensing apparatus and more particularly to apparatus especially adaptable for dispensing gun powder a few grains at a time.

One of the problems associated with powder weighing operations is the inability to add extremely small and controlled amounts of powder to the amount of be weighed. It will be appreciated that it is necessary to weigh the powder to be used in ammunition with a considerable degree of accuracy. Since the weighing operation consists of a manual process, this accurate weighing is at best, time consuming. Heretofore, no provision has been made for a device for permitting controlled dispensing of powder a few grains at a time into the weighing pan.

Therefore a general object of this invention is to provide a novel gun powder dispensing apparatus, of simple and inexpensive construction, which is operable to dispense powder a few grains at a time to thereby permit rapid and accurate weighing of gun powder.

Another object of this invention is to provide a novel gun powder dispensing apparatus including a rotor revolvably mounted in a sleeve and having a helically shaped conveying member operatively connected therewith whereby rotation of the rotor permits progressive movement of a few grains of the powder through the sleeve and discharged therefrom, the apparatus being especially adaptable for use in measuring predetermined amounts of powder during a weighing operation.

A further object of this invention is the provision of a powder measuring apparatus of the class described which allows a user to continuously and accurately weigh predetermined amounts of powder so that the apparatus is especially adaptable for use during a reloading operation.

These and other objects and advantages of my invention will more fully appear from the following description made in connection with the accompanying drawings wherein like character references refer to the same or similar parts throughout the several views, and in which:

FIG. 1 is a side elevational view of the invention;

FIG. 2 is a top plan view thereof;

FIG. 3 is a cross sectional view taken approximately along line 3—3 of FIG. 2 and looking in the direction of the arrows;

FIG. 4 is a cross sectional view taken approximately along line 4—4 of FIG. 3 and looking in the direction of the arrows; and FIG. 5 is an end elevational view of the rotor.

Referring now to the drawings it will be seen that one embodiment of my novel powder measuring device or apparatus, designated generally by the reference numeral 10, is there shown. This powder measuring device 10 includes a supporting frame or structure 11 formed of a suitable rigid metallic material and including a general rectanguar base 12. It will be noted that the base 12 has a plurality of surface engaging supporting feet 13 integrally formed therewith and in the embodiment shown three such feet are provided whereby a three-point support is provided.

The supporting structure 11 includes an upstanding standard 14 integrally formed with the base 12 and, as shown, being of generally frusto-conical configuration. This standard 14 is provided with an upwardly opening generally downwardly tapered recess 15 therein which actually defines a powder receiving hopper. Referring now to FIG. 3 it will be seen that the standard 14 also has a transverse opening or bore 16 therethrough which communicates with the recess 15.

An elongate cylindrical dispensing sleeve 17 extends through the bore 16 and has a forward end projecting outwardly of the standard and beyond the periphery of the base 12. The sleeve 17 is mounted in fixed relation within the bore 16 and it will be seen that the rear end thereof is positioned in close proximity to the outer peripheral surface of the standard 14. Referring again to FIG. 3 it will be seen that the dispensing sleeve 17 has an opening 18 in the upper side thereof which communicates with the hopper recess 15. It will also be noted,, as best seen in FIG. 2, that the size of the sleeve 17 is such that the sleeve completely obstructs the lower end of the hopper recess 15.

A rotor 19 is rotatably disposed in coaxial relation within the sleeve 17 and projects inwardly from one end thereof. It will be seen that the rear portion of the rotor 19 engages the entire inner peripheral surface of the sleeve 17 and that the rear terminal end 20 of the rotor projects exteriorly of the sleeve 17 and is coextensive therewith. It will be seen that the outer surface of the rear end portion 20 is knurled and actually constitutes a finger revolving element for revolving the rotor 19 during the dispensing operation.

It will be noted that the median part of the rotor 19 is of reduced diameter to define a powder receiving portion 21 which, as best seen in FIG. 3, underlies the opening 18 and in operation receives the powder passing through the opening. It will be seen that the powder receiving portion 21 is integrally formed and concentric with the main body portion 19a of the rotor 19. The rotor 19 also includes a forward portion 22 which projects forwardly of the opening 18 and which includes a collar 23, the latter corresponding in size to the main body portion 19a, as best seen in FIGS. 3 and 5, and which engages substantially the entire inner periphery of the sleeve 17 in the manner of the main body portion 19a. Except for the collar 23, the forward portion 22 is of reduced diameter but is slightly larger than the diameter of the powder receiving portion 21.

Referring again to FIGS. 3, 4 and 5 it will be seen that the forward portion 22 has a longitudinally extending groove 24 therein which extends entirely through the forward portion and through the collar 23 and the powder receiving portion 21. This groove, as best seen in FIGS. 4 and 5, is of arcuate configuration and serves to permit forward axial discharge of powder from the powder receiving portion 21 through the forward portion 24 and into the sleeve 17. It is also pointed out that the sleeve 17 will be inclined slightly forwardly when the device 10 is positioned upon a substantially flat surface to thereby facilitate discharge of the material from the sleeve.

A helical conveyor member 25 is positioned within the sleeve 17 and has its rear end connected with the forward portion 22 of the rotor 19. The lead of the helical conveyor member 25 is positioned in very close proximity to the front terminal edge of the sleeve 17. This helical conveyor member 25 is actually constructed, in the embodiment shown, from a helically bent metallic element in the manner of a coil spring. It will be seen that when the rotor 19 is revolved, the helical member 25 being connected thereto will also be revolved. Thus when small amounts of powder such as a few grains are caused to fall forwardly from the groove 24 and into the sleeve 17, the revolving helical conveyor member will progressively convey this material forwardly through the sleeve 17 for discharge therefrom.

When the powder measuring device 10 is used during a powder weighing operation, the weighing pan P will be positioned below the forward end of the sleeve 17. If several rounds or shells are to be loaded, a container such as the bottle B may be positioned so that the mouth thereof discharges into the hopper recess 15 as best seen in FIG. 1. With this arrangement, the hopper 15 will be constantly supplied with granular gun powder and this gun powder will pass through the opening 18 of the sleeve 17 and into the grooved powder receiving portion 21 of the rotor 19. As the rotor 19 is revolved, the powder will be spilled or caused to flow through the groove 24 axially forwardly from the rotor. This discharge of the powder will involve axial movement of only a few grains at a time into that portion of the sleeve 17 located forwardly of the rotor 19. Since the helical conveyor member 25 rotates with the rotor 19, a few grains of powder will be constantly moved forwardly along the inclined sleeve 17 to the discharge end thereof. The lead end portion of the helical conveyor member 25 will cause only a few grains to fall into the weighing pan P. Therefore only slight additions of material that are necessary for accurate weighing may be accomplished through the use of the powder dispensing device 10.

In this connection, the discharge end of the sleeve 17 may be positioned upon a support to discharge directly into the weighing pan while the latter is suspended from a scale mechanism of the type used in powder measuring operations. Thus the necessary amount of powder for a charge may be readily and accurately determined.

It will be noted that in order for the granular powder material to be received within that portion of the groove 24 which extends through the powder receiving portion 21, the rotor 19 must be oriented so that the groove 24 is facing upwardly. The entire rotor assembly 19 may be readily removed from the sleeve 17 by axially withdrawing the rotor rearwardly.

From the foregoing it will be seen that I have provided a novel powder dispensing device which permits dispensing of gun powder a few grains at a time so that the dispensing device is especially adaptable for use in a powder weighing operation during a reloading process.

It will be noted from the preceding paragraphs that my novel dispensing apparatus while being manually operable, is capable of a continuous operation while lending itself to facilitating accurating weighing of the powder.

Thus it will be seen that I have provided a novel powder dispensing apparatus which is not only of simple and inexpensive construction but one which functions in a more efficient manner than any heretofore known comparable device.

It will of course be understood that various changes may be made in the form, details, arrangement and proportions of the various parts without departing from the scope of my invention.

What is claimed is:

1. A small portable dispensing apparatus for dispensing gun powder, a few grains at a time, said apparatus comprising
   a supporting frame,
   a rigid horizontally disposed sleeve on the frame and having an open forward end and having a supply opening in the upper side thereof spaced from said end,
   a substantially cylindrically shaped rotor within said sleeve having a recess therein defining a powder receiving portion extending beneath said supply opening, and having a forward portion disposed forwardly of said supply opening and engaging substantially the entire inner peripheral surface of the sleeve adjacent the rear end portion thereof,
   said rotor having an elongate groove extending through said forward portion and communicating with said powder receiving portion whereby powder received within said powder receiving portion will be discharged through the groove and from the forward end of the rotor,
   an elongate helical conveying member positioned within said sleeve and in engaging relation with the inner periphery thereof,
   said conveyor member having its leading end disposed closely adjacent the forward end of said sleeve and having its rear end connected with said rotor for rotation therewith to permit gun powder to be dispensed from the forward end of the sleeve a few grains at a time.

2. A small portable dispensing apparatus for dispensing gun powder, a few grains at a time, comprising
   a supporting frame including an upstanding support member having an upwardly opening recess therein and defining a powder receiving hopper,
   a rigid horizontally disposed sleeve on said support member having an open forward end and having a supply opening in the upper side thereof spaced from said forward end and communicating with said hopper defining recess,
   a rotor within said sleeve and having a powder receiving portion extending beneath said supply opening and having a forward portion disposed forwardly of said supply opening and engaging substantially the entire inner peripheral surface of the sleeve adjacent the rear end portion thereof,
   said rotor having an elongate groove extending through said forward portion and communicating with said powder-receiving portion whereby powder received within said powder receiving portion will be discharged through the grove and from the forward end of the rotor,
   and an elongate helical conveying member positioned within said sleeve and in engaging relation with the periphery thereof,
   said helical conveying member having its leading end disposed closely adjacent the forward end of said sleeve and having its rear end connected with said rotor for rotation therewith to permit gun powder discharged into said sleeve through said groove to be dispensed from the forward end of the sleeve a few grains at a time.

3. A small portable dispensing apparatus for dispensing gun powder, a few grains at a time, said apparatus comprising
   a supporting frame, including an upstanding support member having an upwardly opening recess therein defining a powder-receiving hopper, said upstanding support member having a fore-and-aft opening therethrough,
   a rigid horizontally disposed sleeve positioned in fixed relation in said opening and projecting forwardly from said support member,
   said sleeve having an open forward end and having a supply opening in the upper side thereof spaced from said forward end and communicating with said hopper defining recess,
   a generally cylindrically shaped rotor within said sleeve and having a recess therein defining a powder receiving portion extending beneath said supply opening, and having a forward portion disposed forwardly of said supply opening and engaging substantially the entire inner peripheral surface of the sleeve adjacent the inner end portion thereof,
   said rotor having an elongate groove extending through said forward portion and communicating with said powder-receiving portion whereby powder received within said powder receiving portion will be discharged through the groove and from the forward end of the rotor,
   and an elongate coiled helical conveying member positioned within said sleeve and in engaging relation with the periphery thereof,
   said conveying member having its leading end disposed closely adjacent the forward end of said sleeve and having its rear end connected with said rotor for rotation therewith to permit gun powder to be dispended from the forward end of the sleeve a few grains at a time.

4. The apparatus as defined in claim 3 wherein said rotor has a portion thereof located exteriorly of said sleeve and defining a revolvable actuating element.

5. A small portable dispensing apparatus for dispensing gun powder, a few grain at a time, said apparatus comprising
- a supporting frame,
- a rigid horizontally disposed sleeve on the frame and having an open forward end and having a supply opening in the upper side thereof spaced from said end,
- a generally cylindrically shaped rotor within said sleeve and having a recess therein defining a powder receiving portion extending beneath said supply opening, and having a forward portion disposed forwardly of said supply opening and engaging substantially the entire inner peripheral surface of the sleeve adjacent the rear end portion thereof,
- said rotor having an elongate groove extending through said forward portion and communicating with said powder receiving portion and having a rear portion located exteriorly of the rear end of said sleeve and defining a revolvable arcuate element whereby powder received within said powder receiving portion will be discharged through the groove and from the forward end of the rotor,
- and an elongate coiled helical conveying member positioned within said sleeve and in engaging relation with the inner periphery thereof,
- said coiled conveyor member having its leading end disposed closely adjacent the forward end of said sleeve and having its rear end connected with said rotor for rotation therewith whereby gun powder discharged from said rotor and into said sleeve will be conveyed axially forwardly thereof and will be dispensed from the forward end thereof a few grains at a time.

References Cited in the file of this patent
UNITED STATES PATENTS

| | | |
|---|---|---|
| 614,000 | Hutchison et al. | Nov. 8, 1898 |
| 1,047,589 | Sutton | Dec. 17, 1912 |
| 1,764,510 | Goodfellow | June 17, 1930 |
| 2,573,566 | Hammann | Oct. 30, 1951 |
| 2,593,960 | Ballew | Apr. 22, 1952 |
| 2,643,796 | Gustafson | June 30, 1953 |